C. HEINZELMANN.
NECKTIE RETAINER.
APPLICATION FILED JULY 20, 1915.
1,209,158.
Patented Dec. 19, 1916.
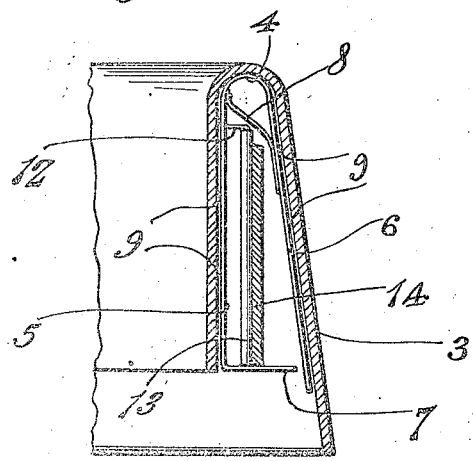
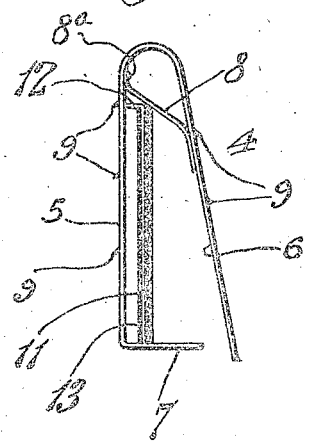
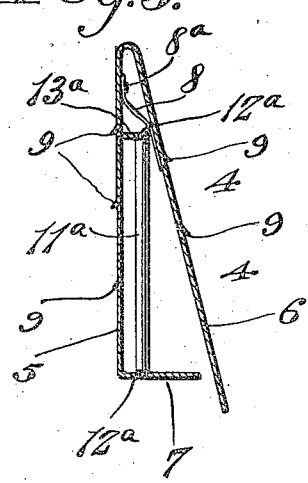
Inventor,
Carl Heinzelmann,

# UNITED STATES PATENT OFFICE.

CARL HEINZELMANN, OF BIRD ISLAND, MINNESOTA.

NECKTIE-RETAINER.

1,209,158.　　　　　　Specification of Letters Patent.　　Patented Dec. 19, 1916.

Application filed July 20, 1915.　Serial No. 40,965.

*To all whom it may concern:*

Be it known that I, CARL HEINZELMANN, a citizen of the United States, residing at Bird Island, in the county of Renville and State of Minnesota, have invented certain new and useful Improvements in Necktie-Retainers; and I do hereby declare the following to be a full, clear, and exact description of the invention, such as will enable others skilled in the art to which it appertains to make and use the same.

This invention relates to collar attachments, and more particularly to a simple and efficient device especially designed for retaining the folds of a turndown collar in spaced relation so as to facilitate easy and convenient adjustment of the necktie therein.

The invention has for its object to provide an efficient and inexpensive necktie retainer including essentially a frame embodying means for securing the same position between the folds of a collar and a roller rotatably supported in the frame for supporting the necktie.

With this and other objects in view, the invention consists in the novel construction, arrangement and formation of parts as will be hereinafter specifically described, claimed and illustrated in the accompanying drawing, in which:

Figure 1 represents a transverse sectional view through a collar of the usual turndown type, illustrating the improved necktie retainer attached thereto. Fig. 2 represents an edge elevation of the necktie retainer removed, and partly in section, and Fig. 3 represents a longitudinal sectional view through a slightly modified type of the retainer.

Referring to the drawing in detail, wherein similar reference numerals designate corresponding parts throughout the several views, the numeral 5 indicates the frame of the retainer generally, which is preferably formed of a relatively thin strip of sheet metal bent at a point adjacent its longitudinal center to define a pair of divergent members 5 and 6, the free end of the member 5 being directed angularly, as indicated at 7, and spaced from the adjacent extremity of the other member 6. Adjacent the point of connection of the divergent members 5 and 6 a curved leaf spring 8 is anchored at 8ª to the member 5 and engages at its free terminal with the inner surface of the member 6, thereby normally retaining the members 5 and 6 in divergently spaced relation.

A plurality of prongs or teeth 9 are struck out from the members 5 and 6 and the pointed extremities thereof are directed toward the free ends of the members, whereby when the retainer is inserted between the folds of a collar 3, as clearly illustrated in Fig. 1, the teeth 9 engage the inner surfaces of the folds of the collar and thus effectively retain the device in operative position.

A rod 11 is rigidly secured at one end to the angularly directed extremity 7 of the member 5 and the opposite angular end 12 thereof is rigidly secured to the member 5 at a point adjacent the connection of the spring 8 with said member 5. A bearing roller 13 is rotatably mounted upon the rod 11 between the angular extremities 7 and 12 of the member 5 and rod 11, respectively.

Referring to the modification of the invention illustrated in Fig. 3 the bearing roller 11ª is provided with axial extensions 12ª rotatably journaled in lateral extensions 13ª and 7 carried by the bearing member 5.

In use, the necktie retainer is slipped between the folds of the collar 3 and is retained in operative position therein by the teeth 9, which engage the inner surfaces of the folds of the collar and are retained in frictional engagement therewith by the tension of the spring 8. The necktie 14 is positioned over the rollers 13 of the retainers and is thus held in spaced relation to the inner surfaces of the folds of the collar.

What I claim is:

1. A necktie retainer including a pair of divergent members, means connecting the adjacent extremities of said divergent members, a leaf spring secured to the upper portion of one of said members and engaging the other member for normally retaining the latter in spaced relation, and an angularly disposed portion formed integral with one of said members and extending inwardly toward the other of said members to limit the inward movement of said last mentioned member thereby preventing the binding of a necktie.

2. A necktie retainer including a pair of divergent members, means connecting the adjacent extremities of said divergent members, a spring secured to the upper portion of one of said members and engaging the other member for normally retaining the latter in spaced relation, and a roller disposed in spaced relation between the members for the purpose specified.

3. A necktie retainer including a pair of divergent members, means connecting the adjacent extremities of said divergent members, a spring secured to the upper portion of one of said members and engaging the other member, one of said members having a right angular extension extending inwardly toward the other member, and a roller rotatably mounted upon said right angular portion and the upper part of said member for the purpose specified.

In testimony whereof I affix my signature in presence of two witnesses.

CARL HEINZELMANN.

Witnesses:
    J. C. DESMOND,
    W. H. FUVER.